United States Patent
Mihayiov et al.

(10) Patent No.: US 6,979,361 B2
(45) Date of Patent: Dec. 27, 2005

(54) END OF SERVICE LIFE INDICATOR FOR FLUID FILTER

(76) Inventors: Gueorgui Milev Mihayiov, 1745 Lake Christopher Dr., Virginia Beach, VA (US) 23464; Kirollos Salama Kirollos, 1701 Butterchurn Ct., Virginia Beach, VA (US) 23456; Tesfa-Michael Tekleab, 908 Armfield Cir. #201, Norfolk, VA (US) 23505

( * ) Notice: Subject to any disclaimer, the term of this patent is extended or adjusted under 35 U.S.C. 154(b) by 0 days.

(21) Appl. No.: 10/621,591

(22) Filed: Jul. 17, 2003

(65) Prior Publication Data

US 2004/0083896 A1 May 6, 2004

Related U.S. Application Data

(60) Provisional application No. 60/396,887, filed on Jul. 17, 2002.

(51) Int. Cl.[7] ............................................. B01D 46/44
(52) U.S. Cl. ............................. 96/26; 96/414; 96/421; 96/417; 96/415; 96/416; 96/117; 96/117.5; 95/25; 55/DIG. 34
(58) Field of Search .................. 96/414–417, 421, 96/117, 117.5, FOR 170, FOR 26, 26; 55/DIG. 34; 95/25

(56) References Cited

U.S. PATENT DOCUMENTS

| | | | |
|---|---|---|---|
| 2,249,867 A * | 7/1941 | Snelling .................. 73/335.08 |
| 3,635,001 A * | 1/1972 | Komroff et al. .............. 96/417 |
| 4,146,887 A | 3/1979 | Magnante |
| 4,154,586 A | 5/1979 | Jones et al. |
| 4,326,514 A | 4/1982 | Eian |
| 4,336,038 A * | 6/1982 | Schultheiss et al. .......... 96/417 |
| 4,365,627 A | 12/1982 | Wing |
| 4,530,706 A | 7/1985 | Jonea |
| 4,684,380 A | 8/1987 | Leichnitz |
| 5,148,803 A | 9/1992 | Schlobohm |
| 5,505,753 A * | 4/1996 | Heysek ......................... 96/416 |
| 6,110,260 A * | 8/2000 | Kubokawa ..................... 96/26 |
| 6,315,821 B1 * | 11/2001 | Pillion et al. .................. 96/416 |
| 6,375,725 B1 | 4/2002 | Bernard et al. |
| 6,497,756 B1 | 12/2002 | Curado et al. |
| 6,508,868 B2 * | 1/2003 | Pillion et al. .................. 96/416 |
| 6,716,266 B2 * | 4/2004 | McNaughton ................ 55/495 |
| 6,800,106 B2 * | 10/2004 | Cogar et al. ................ 55/385.6 |
| 2004/0065195 A1 * | 4/2004 | Gogins ............................ 95/8 |
| 2004/0083896 A1 * | 5/2004 | Mihaylov et al. .............. 96/414 |
| 2004/0163367 A1 * | 8/2004 | Cogar et al. ................ 55/385.6 |

* cited by examiner

*Primary Examiner*—Duane Smith
*Assistant Examiner*—Minh-Chau T. Pham
(74) *Attorney, Agent, or Firm*—Goldizen & Associates; Bradley D. Goldizen

(57) ABSTRACT

An end of service life indicator (ESLI) device for a fluid filter is included on the filter and visually indicates when the life of the filter has expired. The ESLI indicates the depletion of the filter by changing the color density on a surface of the device to a color density having a well distinguishable contrasting pattern that is easily recognizable even by individuals who are color-blind. The contrasting pattern may express text indicative of the state of the filter.

8 Claims, 7 Drawing Sheets

END OF SERVICE LIFE INDICATOR FOR FLUID FILTER

This application claims priority from U.S. Provisional Patent Application Ser. No. 60/396,887 filed on Jul. 17, 2002.

This application did not receive federal research and development funding.

FIELD OF THE INVENTION

This invention relates to an end of service life indicator (ESLI) for a fluid filter. More particularly, the invention relates to a device that visually indicates when the life of a fluid filter has expired, by changing the color density on a surface of the device to a color density having a well distinguishable contrasting pattern that is easily recognizable. The ESLI functions to warn a user when enough particulates have been disposed on the surface of the filter to cause a great enough filter load that adversely affects the filter performance. Thus, the present invention generally relates to direct reading devices for determining the expiration of a filter to which the device is attached and more particularly to determine the end of service life of such filter.

BACKGROUND OF THE INVENTION

There is an increased demand for fluid filters used in personal respirators and breathing apparatuses, air filtration systems and other fluid handling systems.

A common method of filtering fluid-borne particulates or other fluid-borne materials from a fluid medium is the placement of a filter member, such as a porous screen or mesh element, directly in the fluid medium. As the fluid medium passes through the filter member, the filtered particulates are typically captured on the filter member. As the quantity of filtered material accumulates on the filter member, a load builds on the filter member, decreasing the filter member's efficiency and increasing the resistance to fluid flow through the filter member. It is a routine procedure to check for the load on the filter member by a measuring means that shows an increase of the filter resistance proportional to the load. Many prior art devices for determining the load condition of filter members are based on sensing a differential in the fluid medium pressure (for example between the "upstream" and "downstream" sides of the filter member) and creating a visual or audible signal indicative of the level of the sensed load. However, these prior approaches typically require significant pressure differences in order to operate properly, and such significant pressure differences are often extremely difficult, or even impossible, to achieve with many filtration systems that deal with only millimeters of water column, differential pressure.

Some prior art devices for indicating the filter medium load condition are directed towards systems having low aerodynamic resistances. An example of one of these devices is disclosed in U.S. Pat. No. 4,336,038 which teaches a filtering device incorporating a filter medium load condition indicator that targets, and indeed can only operate as disclosed with, specific contaminants. In this prior device, oil-containing aerosols eventually dissolve an oil soluble dye to change the color of the filter as the filter life expires. U.S. Pat. No. 4,955,995 discloses a filtering system and filter medium load indicator that employs a similar technique.

U.S. Pat. No. 3,635,001 discloses an air conditioner in which the load condition of a filter member is indicated by color contrast between the buildup of a filtered material and a free surface. This prior device allows a user visually to identify the charge on the filter, but depends strongly on the color difference between the filter material and the filtered particles, which, in the case of domestic dust, are very small.

U.S. Pat. No. 6,110,260 discloses a prior device that uses a similar approach, namely it relies upon the color difference between a buildup of filtered particulates and a filter surface. In this prior device, a change indicator includes an air impervious patch secured to the filter. A portion of the filter media adjacent to the change indicator changes appearance in response to an accumulation of contaminants at a much slower rate than the remainder of the air filter. The accumulation of contaminants progresses inwardly from the region adjacent the periphery of the change indicator towards the region adjacent to the center. The appearance of the filter media beneath the change indicator fully changes from the periphery to the center indicative that the air filter needs to be cleaned or replaced. A drawback to these prior systems is that they are only effective if the dust color is significantly different from the color of the filter. Another drawback is the necessity to observe the filter under the shielding grid that protects the device; thus, the grid has to be open for effective observation.

U.S. Pat. No. 6,375,725 discloses a device that uses contemporary optoelectronic elements to indicate the status of a filter. A problem of such prior devices is that the light generator and detector, along with the other necessary circuit board elements, increase the cost of such devices. Thus, this prior system is expensive to use and cannot be readily deployed in many everyday filtration systems.

In most cases, such as personal breathing devices, air supplying systems (air conditioners and similar), and other technological and/or technical applications using disposable filters, the life of a filter is prematurely reduced by very conservative recommended time of change or personal judgment. The prior art does not include an inexpensive device or means for observing and accurately determining the true end of service life of fluid filters.

BRIEF SUMMARY OF THE INVENTION

It is a general objective of the present invention to overcome the drawbacks of the prior art by providing an inexpensive device or means for readily ascertaining whether the life of a fluid filter has expired.

A primary objective of the present invention is to provide a device capable of visual expression of the depletion of a filter.

Another object of the present invention is to provide a device of the character described in which adequate visual information is provided that is indicative of the depletion of the filter proportional of the filter load and of the end of service life of the same filter.

A further objective of the present invention is to achieve readability independent of the quality of the color vision of the observer. Thus, color blindness does not impair the reading.

Another objective of the present invention is to provide the mentioned device at such a low cost that the final cost of the used filter is comparable or even less than existing ESLI.

Another objective of the ESLI of the present invention is to save energy and ensure the safety of persons using respirators equipped with such ESLI.

Yet another objective of the present invention is to provide a device for integration in a filter array or that attaches to the surface of the filter or filter grid as an additional device indicating the life of the filter.

An additional objective of the present invention is to provide a filter load visual indication that is observable all the times when in use, such that its user does not need to open or remove an obstruction, such as a filter grid, for observation of the load indicator.

A further objective of the invention is to provide an indicator device of the character described that helps prevent negative health effects for users wearing respirators or to help prevent reduced effectiveness of air conditioning (AC) or other air handling systems caused by dirty filters.

It is a further objective of the invention to provide an indicator device that indicates a depletion of the filter capacity proportional to the filter load and not to the age of the filter only.

LIST OF PART NUMBERS

Figure 1:
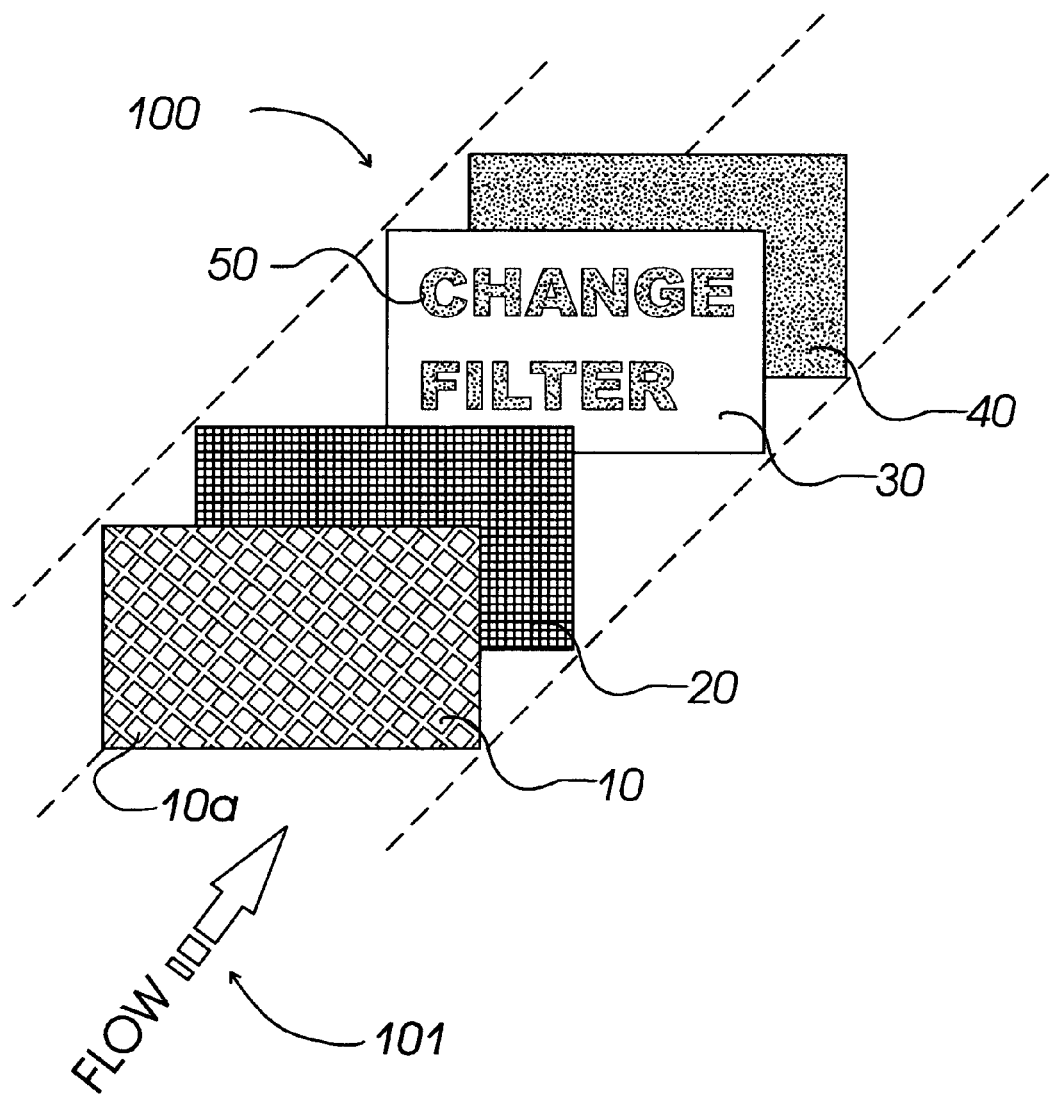
FIG. 1 is an exploded view of the ESLI assembly using different shaped templates.

10. Front housing member
10a. Opening in housing member
20. Filter member
20a. Opening in filter member
21. Tacky substance
30. Template
40. Flow control member
50. Template opening pattern
60. Frame
70. Mounting means
80. Surface of the mentioned filter.
90. Thermo-seam
100. ESLI assembly, general
100a. Modified ESLI assembly
100b. Modified ESLI assembly
101. Arrow indicating flow direction
200. Filtering System
200a. Cross-Sectional Flow Area
201. Primary Filter Media
F. Fluid medium
P. Particulates

DETAILED DESCRIPTION OF THE INVENTION

The present invention is an end of service life indicator (ESLI), generally indicated 100 in the figures, for a fluid filter. As will be described more fully herein below, when inserted into a moving fluid medium F that contains filterable particulate matter P, the ESLI 100 visually indicates when the life of one or more of its constituent fluid filter media members has expired, by changing the color density on a surface of the device to a color density having a well distinguishable contrasting pattern that is easily recognizable. In operation, the ESLI 100 may be included in conjunction with any type of free surface respirator filters, AC filters, gas/mist or gas/aerosol filters, inlet filters of different purifying systems, having a proper design that allows adequate visible observation. The ESLI 100 may be used with either liquid or gaseous fluid media F, including but not limited to air, water, solutions and solvents.

Referring to FIGS. 1, 2, 3 and 4A, 4B, 4C and 9, in the preferred embodiment of the invention a filter member 20 preferably comprises a very fine screen mesh of inert material have a distinguishable color. The filter member 20, however, can alternatively be constructed of any small pore woven or non-woven filter material, such as aluminum. The filter member 20 has a number of openings 20a, the sizes of which are smaller than the average size of the particulate matter. It will be understood that, in operation, while fluid medium F can flow fairly freely through the openings 20a in the filter member 20, the particulate matter P cannot do so and may become deposited on the filter member.

The filter member 20 is preferably disposed adjacent to, and immediately behind, a front housing member 10. The housing member 10 is preferably constructed of a screen (woven or non-woven) material that is either transparent or translucent, is inert (with respect to the materials of the fluid medium F and filterable particulate matter P with which it to be used), and has openings 10a greater than the average size of the particulate matter P. It will be understood that, in operation, both the particulate matter F and the fluid medium F can freely move (for example, via a flowing fluid medium F) through the openings 10a of the front housing member 10. In the preferred embodiment of the invention, the front housing member 10 is constructed of a material such as polyester or nylon, but it may alternatively be constructed of other materials having the characteristics described herein above. It will be understood that, by manufacturing the front housing member 10 from a transparent or translucent material, it is possible to see behind the housing member 10 when looking from a position in front of the housing member 10.

For purposes of simplifying the explanation of the present invention, as used herein, the terms "front", "back", "behind" and the like, refer to the operational orientation of the subject elements as would be seen by an observer facing the direction of fluid medium F flow, as indicated by arrow 101.

The fluid medium F containing particulate matter P passes member 10, preferably made by screen (woven or non-woven) of transparent or translucent inert material (polyester, nylon, etc.) with openings greater than the size of the average particulate matter passing there through. After passing member 10, the fluid flow passes through member 20. The color of filter member 20 preferably has a high color density contrast with respect to that of the expected particulate matter.

In operation, as the fluid medium F flows through the front housing member 10 and the filter member 20, particulate matter P becomes captured by, and accumulates on, the filter member 20.

It is a common misunderstanding that as particulates buildup on filtering media, that the media color always goes from light to dark. In actuality, however, under certain conditions this is not the case. In the present invention, however, the buildup of particulates changes the color of the filter medium 20 from a dark color such as black to a lighter color such as white or light gray. This, lightening rather than darkening phenomenon, occurs during operation of the present invention, for example, when the material of the particulate matter is an industrial powder such as quartz, sugar, ceramic clay, marble, polishing powders, sand blasting powders and/or flour. Thus, it is beneficial to introduce fluorescent colors as explained later. However, flat black or white colors have a greater visible difference when compared to most of the common types of particulate matter. Light and bright fluorescent colors, such as yellow, orange, pink, and blue are preferably used because of the natural contrast even with particulates of same color that do not have a fluorescent effect.

Figure 10:
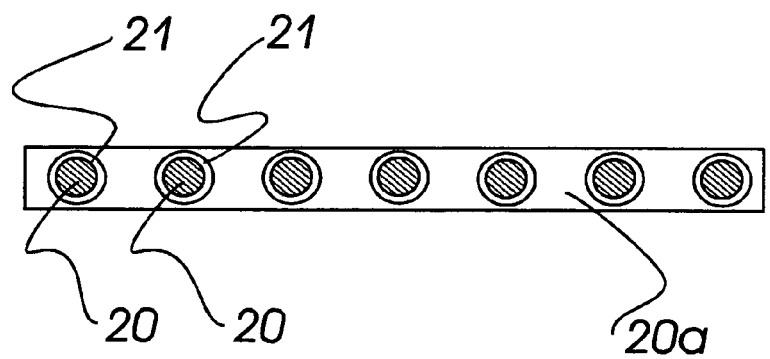
FIG. 10 is a cross-sectional view showing the details of construction of the filter member and the tacky substance.

In the preferred embodiment, the surface of filter member 20 is treated with high viscosity transparent tacky substance 21 such as glycerol, glycols, etc. as shown in FIG. 10. The tacky substance 21 helps to trap and collect particulate matter P such as particles of dust, aerosol, fog, mist, etc. The size of the openings 20a of filter member 20 is slightly greater than the expected average size of the particulate P, which is expressed as an average particulate matter diameter.

A template member 30 is preferably disposed adjacent to, and immediately behind, the filter member 20. The template member 30 comprises a substantially a solid material, preferably in the form of a sheet, with an opening pattern 50 cut therethrough. In the preferred embodiment of the invention, the opening pattern 50 in the template member 30 is in the shape of a legible message, for example "Change Filter" or the like. The sizes of the opening(s) in the template member 30 are substantially greater than the average size of any particulate matter P that the ESLI 100 is likely to be used with while in operation. It will be understood, then, that, in operation, the fluid medium F and particulate matter F may freely flow through the opening in the template member 30.

It will be understood that, in operation, the profile pattern (i.e., perpendicular to the direction of flow 101 of the fluid medium) of the fluid F flow through the filter member 20 is restricted to the openings in the template member 30. In operation, the fluid F therefore passes through filter member 20 only in places superimposed over (i.e., places that are substantially directly in front of) the openings on template member 30. As particulate matter P is trapped on filter member 20, the color/density of the particulates P on the filter member's 20 surface changes only on those restricted places.

As the accumulation of particulates P increases with continued use of the filter member 20, at a certain point, the color difference between the places that allow flow (i.e., places that are substantially directly in front of the openings on the template 30) and the places blocked by the solid surface of template member 30 becomes visible from in front of the front housing member 10.

One or more flow control member 40 may be disposed adjacent to, and immediately behind, the template member 30. The point at which the color change occurs may be adjusted by varying the actual capacity of the filter material 20, or by varying the flow resistance of the flow control member 40. Flow control member 40 preferably comprises a porous material such as a porous paper, fabric, glass-fiber fabric, different membranes, etc.

Mounting means 70 are provided for securing the other components of the assembled ESLI 100 to a fluid filtering system 200. In the preferred embodiment of the invention, the cross-sectional area (i.e., as measured in a plane perpendicular to the nominal direction of flow of fluid through the fluid filtering system 200), is substantially smaller than the cross-sectional flow area (200a) of the fluid filtering system 200 at the point of attachment of the ESLI 100 to the fluid filtering system 200.

In operation, the rate of fluid flow through any given surface area of the ESLI 100 (i.e., in line with openings in the template 30, and perpendicular to the direction of flow) is proportional to the rate of fluid flow through the remainder of the filtering system's 200 cross-sectional area 200a. By varying the capacity of the filter member 20 and/or the flow resistance of the flow control member 40, the rate and/or quantity of buildup of particulate P over the ESLI 100 that is required for color change (indicative of a contaminated filter) can be adjusted to be (preferably) faster than the rate at which the filtering system becomes contaminated.

Figure 4:
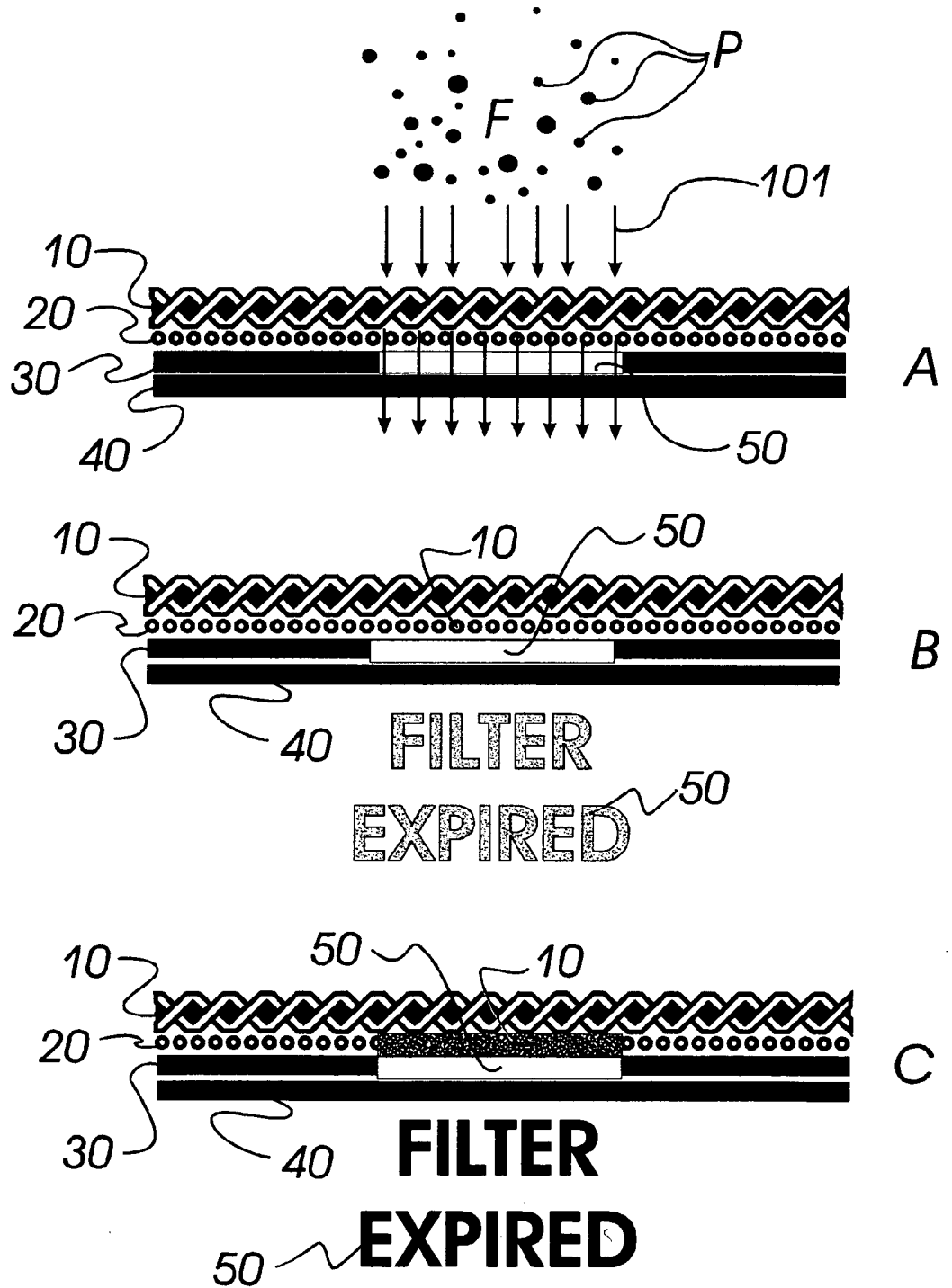
FIG. 4A is a cross-sectional view of the ESLI assembly in an uncharged or clean state.
FIG. 4B is a cross-sectional view of the ESLI with the filter member having about 50% of the filter capacity remaining.
FIG. 4C is a cross-sectional view of the ESLI with the filter member in a completely charged or used state.

This process is illustrated by the three different stages of particulate matter charge shown in FIGS. 4A–C. The buildup on the filter member 20 surface changes the color of this surface comparatively fast and then remains unchanged no matter how much further the filter resistance increases. By adjusting the resistance of flow control member 40, it is possible to adjust the time of appearance of predetermined template opening pattern 50, for example letters or an icon, with the time of end of service life of the primary filter media 201 of the filtering system 200.

Figure 2:
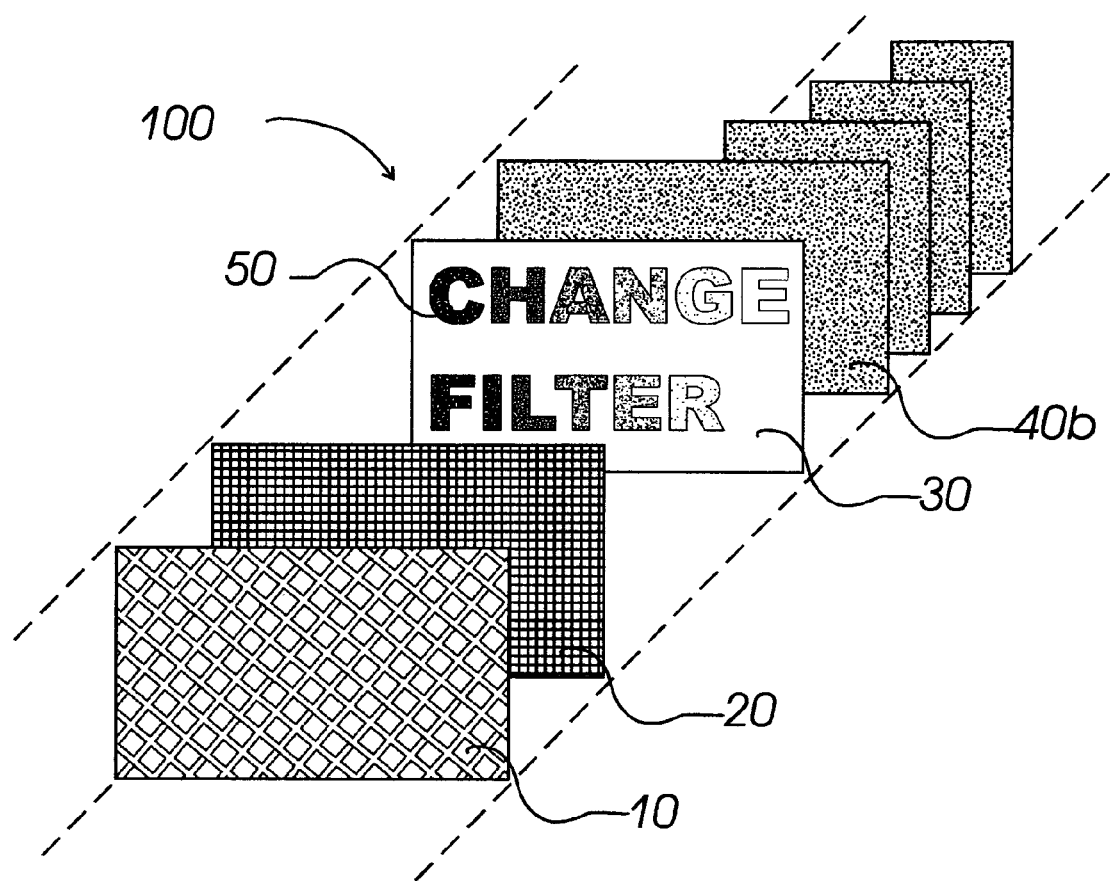
FIG. 2 is an exploded view of the ESLI assembly wherein the flow control member comprises staggered pieces of same material.
Figure 3:
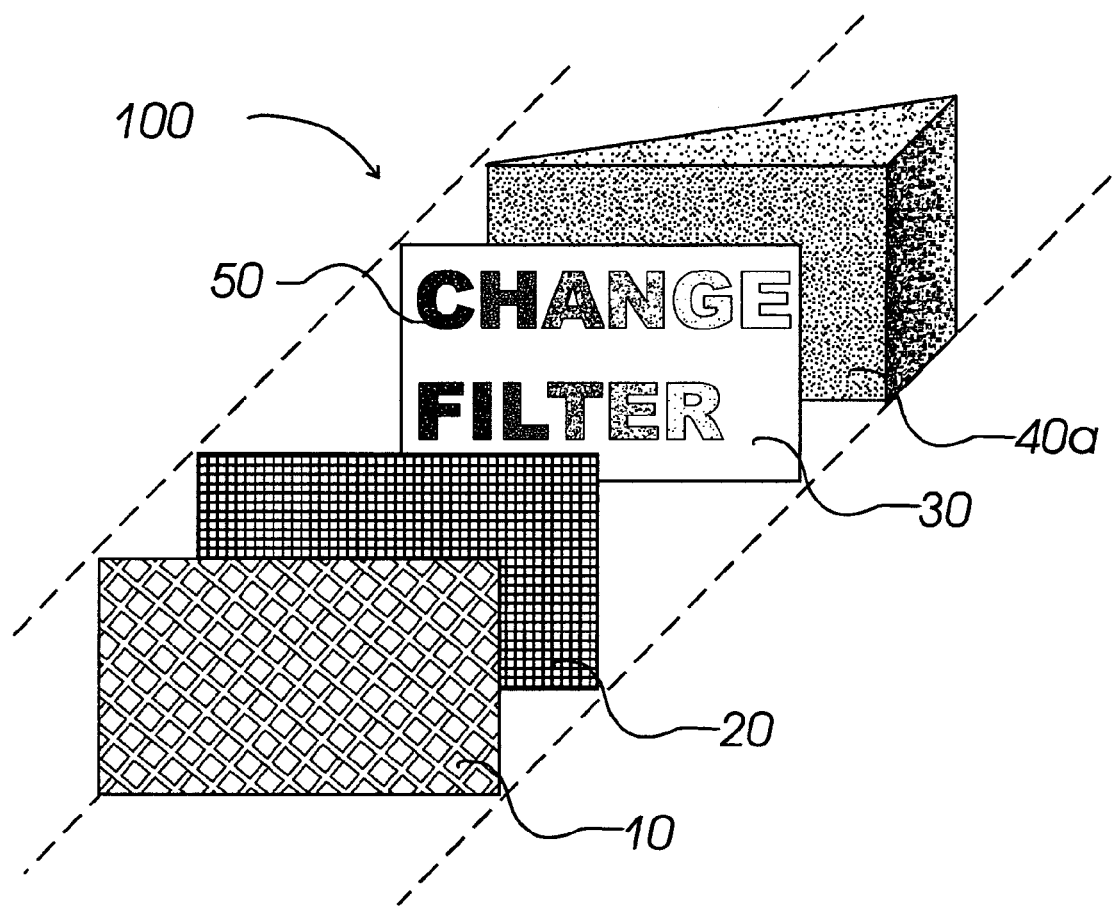
FIG. 3 is an exploded view of the ESLI assembly wherein the flow control member comprises a wedge-shaped porous material.
Figure 5:
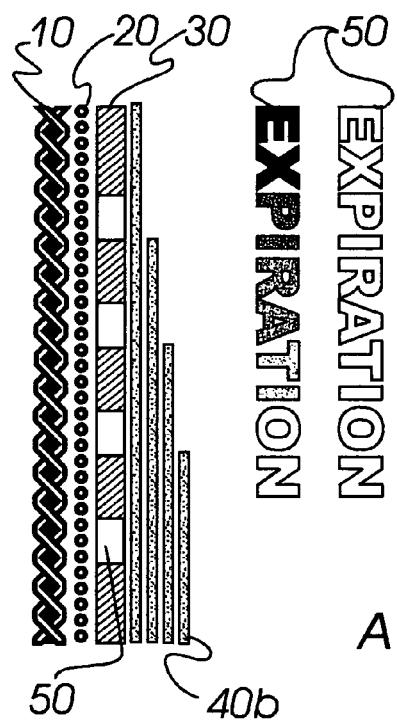
FIG. 5A is cross-sectional view of the ESLI with the flow control member having staggered pieces of material.
FIG. 5B is an exploded view of the arrangement of FIG. 5A.
Figure 5:
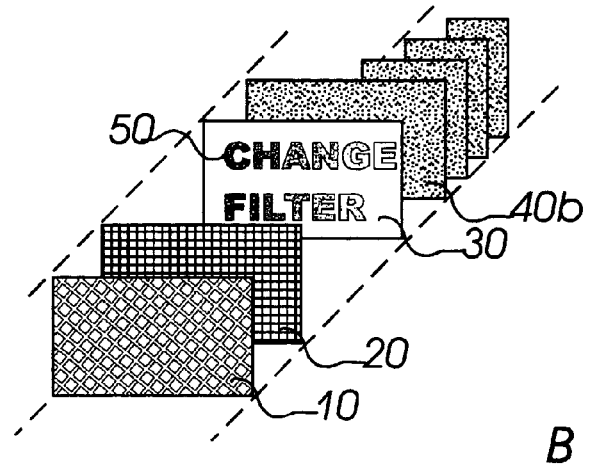
Figure 6:
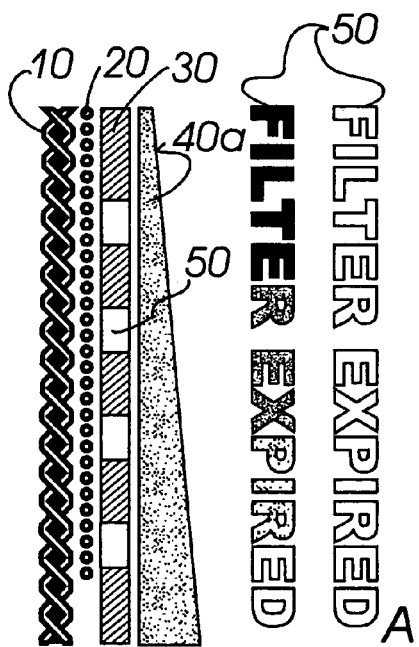
FIG. 6A is a cross-sectional view of the ESLI assembly using a wedge-type flow control member and having two stages of filter member half charged and fully charged shown in parallel.
FIG. 6B is exploded view of the arrangement of FIG. 6A.
Figure 6:
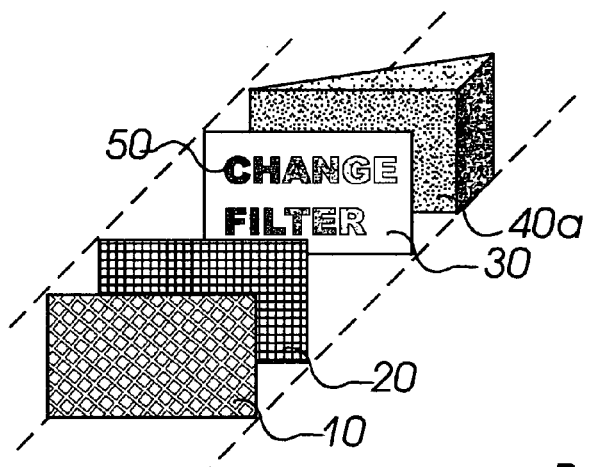

In a modified embodiment of the invention, a modified flow control member 40a or 40b, respectively, is made with gradually changing thickness as shown in FIG. 3 or stepwise as shown in FIG. 2. Varying the thickness of the flow control member 40, 40a or 40b changes the aerodynamic resistance and backpressure. Therefore, when a caution slogan such as "CHANGE FILTER" becomes visible at certain point of exposure, the real time for necessary change of the primary filter media 201 can be selected to be very close, since 85–90% of the total filter capacity of the filter is, or is likely to have been, charged or filled. This circumstance allows some flexibility of the time for real change of the primary filter media 201. The "CHANGE FILTER" slogan can appear visible in a stepwise manner as achieved by the device of FIG. 2 and shown in FIG. 5. Alternatively, the slogan can change gradually from the beginning to the end as in illustrated in FIGS. 3 and 6. In both instances, when the slogan is fully visible, the time for filter change is preferable to be at least 10% less than the real capacity of the filter in order to assure buffer time for change.

Figure 7:
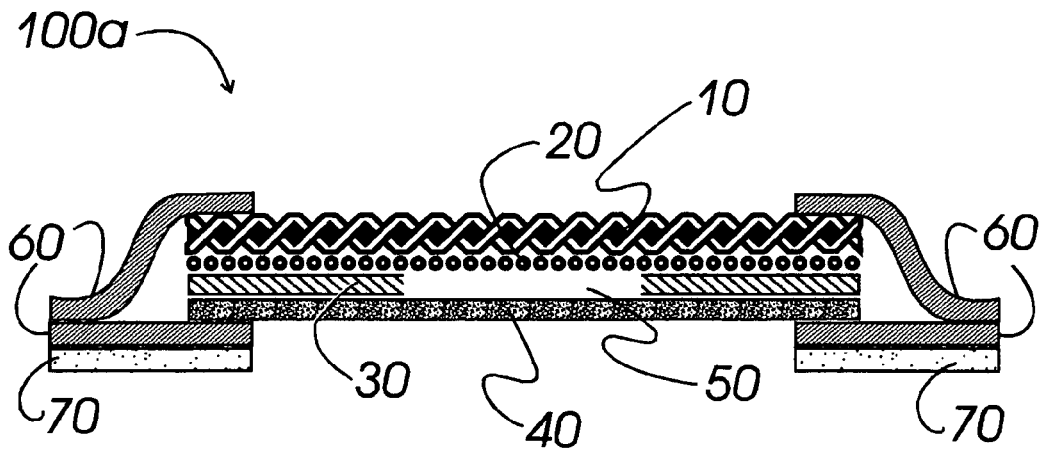
FIG. 7 is a cross-sectional view of the ESLI assembly framed by a plastic or metal frame.

In FIG. 7, a variant of the present invention is shown. All the constituent members (e.g., 10, 20, 30 and 40) of the ESLI 100a are fixed together by means of a plastic or metal frame 60 made from thin material (such as aluminum foil). On the "back" surface of the ESLI 100a assembly, nearest the surface of the monitored filter media 201 there is a attachment means 70 for surface fixation such as adhesive, magnetic tape, "Velcro", etc.

Figure 8:
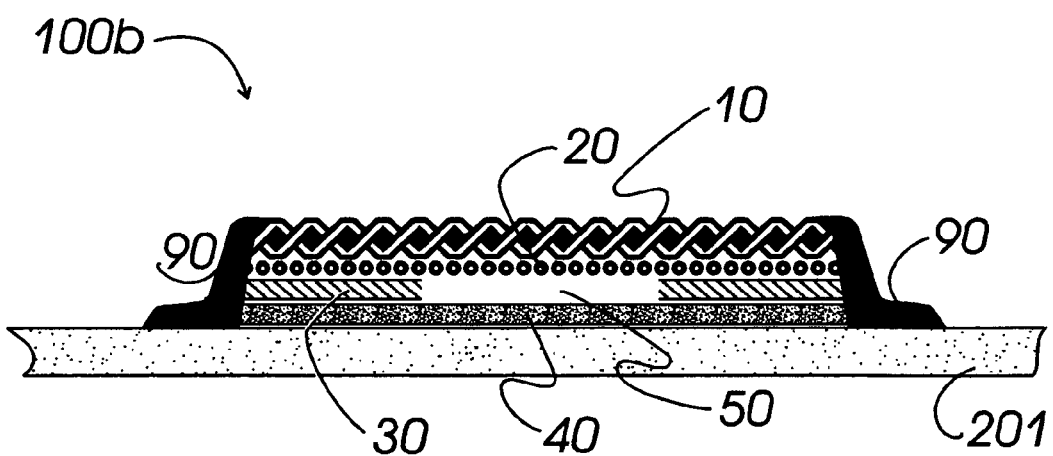
FIG. 8 is a cross-sectional view of the arrangement having all members of the ESLI assembly fixed to each other by mutual melting and fixed to the surface of the filter.
Figure 9:
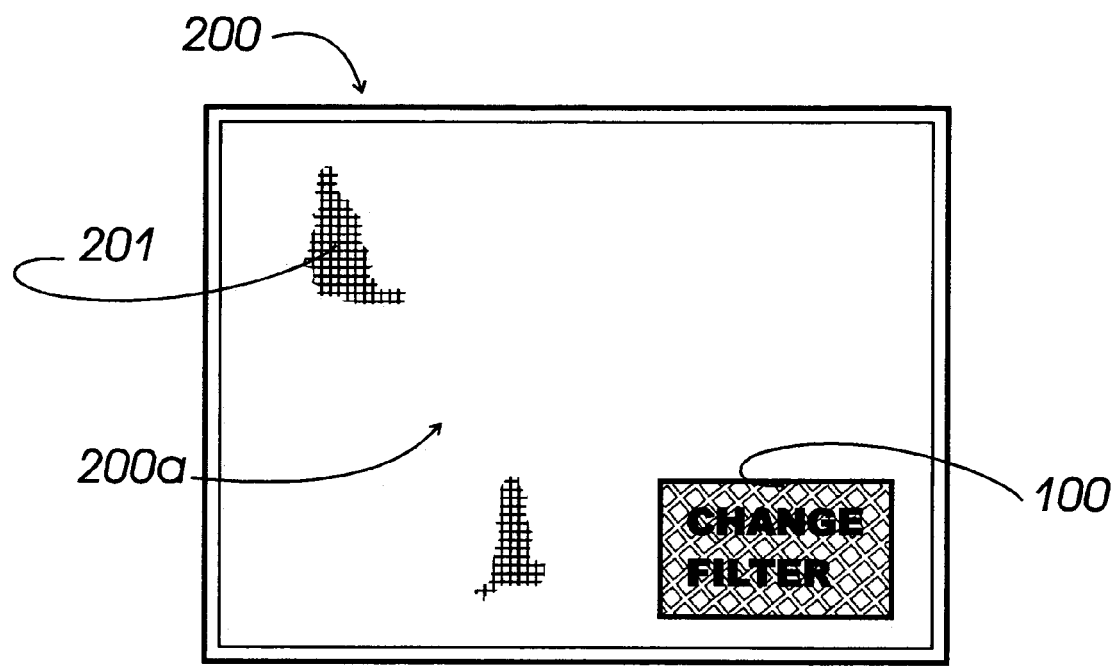
FIG. 9 is a front elevation showing the ESLI attached to the primary filter of a primary filtering system.

In FIG. 8, the constituent members of the ESLI 100b are shown fixed together by a mutual melting, such as sonic welding, of the materials to form a thermo-seam 90, which can be fixed to the primary filter media's 201 surface during the process of melting, or later. The surface of the primary filter media 201 faces the "back" side of the ESLI 100 assembly.

It will be understood by one skilled in the art that the device of the present invention has many advantages over the known art. These include: a high contrast of the developed color change; adjustability of the device upon the expected contaminating particles by changing the background color to a color that contrasts most with the color of the targeted particulates; adjustability of the device to show the gradually changing resistance upon depletion of filter capacity; high visibility and reliability since the end of life indicator is part of the filtering system; low cost of production cost as a separate device and extremely low cost as an integrated part of the filtering system. This technology may advantageously be applied in manufacturing such as color printing, ultrasonic welding, pick and place, etc. Moreover, the device of the present invention is flexible, conformable and can be used over the filter grid or as an integrated unti of the filtering system.

We claim:

1. An end of service life indicator comprising:
   a housing member (10),
   said housing member having a front side and a back side,
   said housing member being constructed of a solid material,
   and having a plurality of housing openings (10a) extending from said front side to said back side of said housing member;
   each of said housing openings being of sufficient cross-sectional area to allow a fluid medium (F) and particulates (P) to pass;
   a filter member (20) disposed adjacent to said housing member,
   said filter member comprising a porous solid through which said fluid medium can pass,
   said filter member being adapted to adhere to said particulates;
   a template member (30),
   said template member being disposed adjacent to said filter member,
   and said template member comprising a solid material, said solid material being substantially impervious to said fluid medium;
   said template member (30) having a front side and a back side and a template opening pattern (50), said template opening pattern comprising an opening in said template member extending from said front side to said back side of said template member.

2. The indicator of claim 1,
   further comprising a tacky substance (21), said tacky substance being permanently adhered to a surface of said filter member (20).

3. The indicator of claim 2, further comprising:
   attachment means (70) for attaching said housing member (10), said filter member (20) and said template member (30) to a primary filter medium (201) of a primary filtering system (200).

4. The indicator of claim 2, wherein said front side of housing member (10) comprises a color highly contrasted to an expected color of particulate (P) build up such that a calorimetric indication occurs when said particulate build up exceeds a preset threshold.

5. The indicator of claim 2 wherein a color of said front side of housing member (10) is one or more colors selected from a group consisting of black, white, fluorescent yellow, fluorescent pink, fluorescent orange, fluorescent blue and fluorescent green.

6. The indicator of claim 3, wherein said template opening pattern (50) is in the form of alphabetic letters.

7. The indicator of claim 6,
   wherein said housing member is constructed of a transparent or translucent material, such that said front side of said filter member is visible from said front side of said housing member.

8. An end of service life indicator comprising:
   a housing member (10),
   said housing member having a front side and a back side,
   said housing member being constructed of a solid material,
   and having a plurality of housing openings (10a) extending from said front side to said back side of said housing member;
   each of said housing openings being of sufficient cross-sectional area to allow a fluid medium (F) and particulates (P) to pass;
   a filter member (20) disposed adjacent to said housing member,
   said filter member comprising a porous solid through which said fluid medium can pass,
   said filter member being adapted to adhere to said particulates;
   a template member (30),
   said template member being disposed adjacent to said filter member,
   and said template member comprising a solid material, said solid material being substantially impervious to said fluid medium;
   said template member (30) having a front side and a back side and a template opening pattern (50), said template opening pattern comprising an opening in said template member extending from said front side to said back side of said template member;
   and further comprising a humidifier (21), said humidifier being permanently adhered to a surface of said filter member (20);
   and further comprising a primary filtering system (200) having a primary filter medium (201);
   and further comprising attachment means (70) for attaching said housing member (10), said filter member (20) and said template member (30) to said primary filter medium (201) of a primary filtering system (200);
   and wherein said template opening pattern (50) is in the form of alphabetic letters;
   and wherein said housing member is constructed of a transparent or translucent material, such that said front side of said filter member is visible from said front side of said housing member;
   and wherein said front side of said filter member has a first color, and wherein said first color is darker than a color of said particulate.

* * * * *